United States Patent
Zeng et al.

(10) Patent No.: US 11,320,997 B2
(45) Date of Patent: May 3, 2022

(54) METHOD, DEVICE, AND COMPUTER PROGRAM FOR STORAGE MANAGEMENT

(71) Applicant: EMC IP Holding Company LLC, Hopkinton, MA (US)

(72) Inventors: Hongyuan Zeng, Sichuan (CN); Hao Wang, Chengdu (CN); Chaojun Zhao, Chengdu (CN); Yang Zhang, Chengdu (CN); Jiang Tan, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/877,891

(22) Filed: May 19, 2020

(65) Prior Publication Data
US 2021/0124509 A1    Apr. 29, 2021

(30) Foreign Application Priority Data
Oct. 29, 2019    (CN) .......................... 201911039900.6

(51) Int. Cl.
*G06F 3/06*    (2006.01)
(52) U.S. Cl.
CPC .......... *G06F 3/0631* (2013.01); *G06F 3/0604* (2013.01); *G06F 3/0673* (2013.01)
(58) Field of Classification Search
CPC ..... G06F 3/0631; G06F 3/0673; G06F 3/0604
See application file for complete search history.

(56) References Cited

U.S. PATENT DOCUMENTS

| | | | |
|---|---|---|---|
| 7,962,779 B2 | 6/2011 | Patel et al. | |
| 8,131,784 B1 | 3/2012 | Zhuge et al. | |
| 8,392,370 B1 | 3/2013 | Whitney et al. | |
| 8,515,904 B1 | 8/2013 | Dwyer, III et al. | |
| 8,554,809 B1 | 10/2013 | Zhou et al. | |
| 8,892,507 B1 | 11/2014 | Dwyer, III et al. | |
| 9,032,061 B1 | 5/2015 | Xin et al. | |
| 9,063,842 B1 | 6/2015 | Fair et al. | |
| 9,110,599 B1 | 8/2015 | Fair | |
| 9,128,745 B2 * | 9/2015 | Crudele | G06F 3/0631 |
| 9,418,109 B2 | 8/2016 | Narayanan et al. | |
| 9,519,595 B1 | 12/2016 | Zeldin et al. | |
| 9,569,139 B1 | 2/2017 | Mendes et al. | |
| 10,037,341 B1 | 7/2018 | Bassov et al. | |

(Continued)

FOREIGN PATENT DOCUMENTS

| | | |
|---|---|---|
| CN | 1643895 | 7/2005 |
| CN | 101346993 | 1/2009 |

(Continued)

*Primary Examiner* — Sean D Rossiter
(74) *Attorney, Agent, or Firm* — BainwoodHuang (57) ABSTRACT

Storage management techniques involve determining, from a set of users sharing a storage system, a plurality of target users with storage quotas to be updated; obtaining a total increase storage quota to be increased for the storage system; and determining allocation of the total increase storage quota among the plurality of target users according to at least one of a first strategy associated with quota proportions and a second strategy associated with a used storage capacity. The allocation of the increase storage quota is determined automatically according one or more predefined strategies, which can achieve storage quota allocation effectively and automatically, thereby increasing storage efficiency.

20 Claims, 5 Drawing Sheets

(56) References Cited

U.S. PATENT DOCUMENTS

| | | | | |
|---|---|---|---|---|
| 10,311,042 | B1* | 6/2019 | Kumar | G06F 16/2365 |
| 10,882,935 | B2 | 1/2021 | Dossi et al. | |
| 10,951,550 | B2 | 3/2021 | Shani et al. | |
| 11,106,539 | B2 | 8/2021 | Reddy Av et al. | |
| 2012/0263191 | A1* | 10/2012 | Baron | G06F 3/0631 |
| | | | | 370/462 |
| 2012/0272237 | A1* | 10/2012 | Baron | G06F 9/5077 |
| | | | | 718/1 |
| 2014/0068624 | A1 | 3/2014 | Fuller et al. | |
| 2016/0179576 | A1* | 6/2016 | Zhou | G06F 9/5005 |
| | | | | 707/694 |
| 2017/0315934 | A1* | 11/2017 | Muhlestein | G06F 3/0659 |

FOREIGN PATENT DOCUMENTS

| | | |
|---|---|---|
| CN | 102393839 | 3/2012 |
| CN | 103559231 | 2/2014 |
| CN | 108279979 | 7/2018 |
| CN | 108829352 | 11/2018 |

* cited by examiner

METHOD, DEVICE, AND COMPUTER PROGRAM FOR STORAGE MANAGEMENT

CROSS-REFERENCE TO RELATED APPLICATION

This application claims priority to Chinese Patent Application No. CN201911039900.6, on file at the China National Intellectual Property Administration (CNIPA), having a filing date of Oct. 29, 2019, and having "METHOD, DEVICE, AND COMPUTER PROGRAM FOR STORAGE MANAGEMENT" as a title, the contents and teachings of which are herein incorporated by reference in their entirety.

FIELD

Embodiments of the present disclosure generally relate to storage technologies and more specifically, to a method, electronic device, and computer program product for storage management.

BACKGROUND

With the development of data storage technologies, a storage system can provide larger storage space and more intelligent storage management. Current storage systems are designed to be simple and economical with high performance. These storage systems, which can support next-generation storage medium, and has longitudinally expandable and transversely expandable architecture, a flexible consumption model and high-level simplicity.

SUMMARY

Embodiments of the present disclosure provide an improved solution for storage management.

According to a first aspect of the present disclosure, there is provided a method of storage management. The method includes determining, from a set of users sharing a storage system, a plurality of target users with storage quotas to be updated; obtaining a total increase storage quota to be increased for the storage system; and determining allocation of the total increase storage quota among the plurality of target users according to at least one of a first strategy associated with quota proportions and a second strategy associated with a used storage capacity.

According to a first aspect of the present disclosure, there is provided an electronic device. The electronic device includes a processor and a memory coupled to the processor and having instructions stored thereon, the instructions, when executed by the processor, causing the device to perform acts including: determining, from a set of users sharing a storage system, a plurality of target users with storage quotas to be updated; obtaining a total increase storage quota to be increased for the storage system; and determining allocation of the total increase storage quota among the plurality of target users according to at least one of a first strategy associated with quota proportions and a second strategy associated with a used storage capacity.

According to a third aspect of the present disclosure, there is provided a computer program product being tangibly stored on a computer-readable medium and including computer-executable instructions, the computer-executable instructions, when executed, causing a device to: determine, from a set of users sharing a storage system, a plurality of target users with storage quotas to be updated; obtain a total increase storage quota to be increased for the storage system; and determine allocation of the total increase storage quota among the plurality of target users according to at least one of a first strategy associated with quota proportions and a second strategy associated with a used storage capacity.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in example embodiments of the present disclosure.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although some preferred embodiments of the present disclosure are shown in the drawings, it would be appreciated that the description of those embodiments is merely to enable those skilled in the art to better understand and further implement the present disclosure, without suggesting any limitation to the scope disclosed herein in any manner.

As used herein, the term "include" and its variants are to be read as open-ended terms that mean "include, but is not limited to." The term "or" is to be read as "and/or" unless explicitly being defined otherwise. The term "based on" is to be read as "based at least in part on." The terms "one example embodiment" and "an embodiment" are to be read as "at least one example embodiment." The term "another embodiment" is to be read as "at least one further embodiment." The terms "first" and "second" can denote different or identical objects. Other definitions, either explicit or implicit, may be included in the following.

Figure 1:
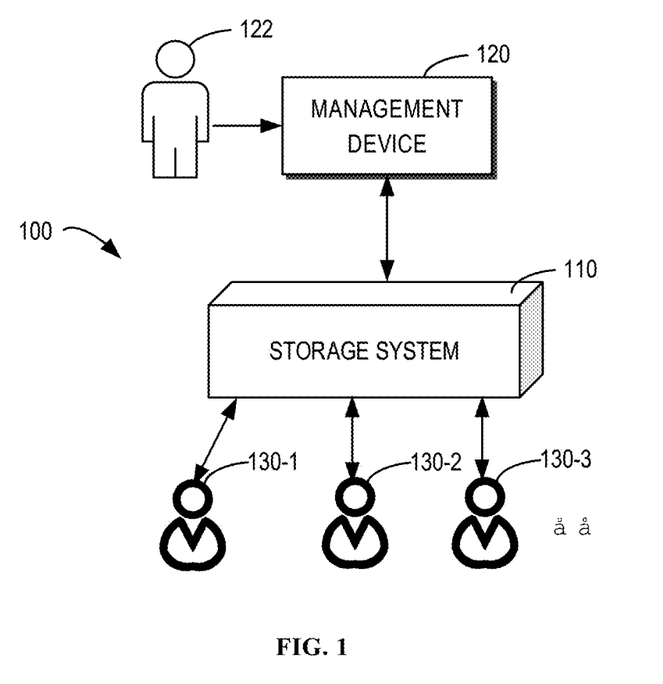
FIG. 1 illustrates a schematic diagram of an environment in which embodiments of the present disclosure can be implemented.

FIG. 1 illustrates a schematic diagram of an environment 100 in which embodiments of the present disclosure can be implemented. It would be appreciated that architecture and functions of the environment 100 are described for purpose of for purpose of examples only without suggesting any limitation to the scope of the present disclosure. Embodiments of the present disclosure may also be applied into environments with different structures and/or functions.

As shown, a storage system 110 is constructed to provide a storage space. The storage system 110 may be managed by a management device 120. In some embodiments, the management device 120 may be operated by an administrator 122 to manage the storage system 110. The management device 120 may be any devices with a capability of computing and processing, such as a server, personal computer, and the like.

The storage system 110 may be constructed based on one or more storage disks or storage nodes. Storage disks used to construct the storage system 110 may be various storage disks, including but not limited to, Solid-State Disks (SSDs), magnetic disks, and optical disk etc.

Storage disks or storage nodes in the storage system 110 may be any types of storage devices as long as they can provide a data storage space. Some examples of the storage devices include, but are not limited to, Solid-State Disk (SSD), Hard Disk Drive (HDD), Serial Advanced Technology Attachment (SATA) disk, and Serial Attached (SA) Small Computer System Interface (SCSI) disk (i.e., SAS disk), and/or the like. The disks may have any capacity. The storage system 110 may provide data and file storage based on various storage technologies. The storage system 110 may sometimes also be referred to as a File System (FS).

The storage space (also referred to as a storage capacity) of the storage system 110 may be shared by a plurality of users 130-1, 130-2, 130-3, etc., sometimes collectively or individually referred to as users 130 herein. In other words, a plurality of users 130 may write data into the storage system 110 and read corresponding data from the storage system 110. The plurality of users 130 may read and write data from/to the storage system 110 by means of corresponding client devices (not shown).

Technologies based on user quotas may be utilized to manage the storage system 110. Specifically, storage quotas may be set for the respective users 130. A storage quota of a user 130 indicates an upper limit of the storage capacity of the storage system 110 to be used by this user 130. As used herein, the storage quota sometimes is also referred to as a "quota" for short. For example, if a storage quota of a user 130 is 40 GB, it means that this user can use up to a storage capacity of 40 GB in the storage system 110. In some embodiments, a total storage quota allocated to all the users 130 of the storage system 110 may be larger than the actual storage capacity of the storage system 110. For example, when the storage system 110 can provide an actual storage capacity of 100 GB, a total storage quota of 150 GB may be allocated to all the users 130 as required. This quota allocation may improve utilization of the storage space, as not all the users always fully utilize their storage quotas.

It would be appreciated that the elements and arrangements shown in FIG. 1 are for purpose of examples only. The storage system 110 may be shared by any number of users. In some embodiments, the management device 120 may be considered as a part of the storage system 110. Although illustrated as a single device, the management device 120 may also be implemented by a plurality of separate devices.

Usually, when a user joins the storage system, the user is initially allocated with a storage quota, for example, by the administrator according to the specific condition of the user. However, the storage quotas initially allocated to the user may need to be modified as the business development of the storage system. For example, if the actual storage capacity of the storage system increases (e.g., by adding new storage devices) or the total storage quota of the storage system is modified in view of other requirements, the storage quotas of the respective users may also be adjusted.

In a conventional solution, the administrator is usually required to determine the storage quotas to be adjusted for the respective users based on his/her experience and then set the quotas manually. The current storage systems or management devices cannot directly and automatically provide any assistance to the administrator. Such manual approach requires a large amount of management labors, resulting in low efficiency. In addition, the different experiences and knowledge of administrators may lead to inappropriate quota allocations.

In accordance with embodiments of the present disclosure, there is provided a solution of automatically allocating the storage quotas. In the solution, a plurality of target users is determined from a set of users of the storage system and a total increase storage quota to be increased for the storage system is obtained. Then, allocation of the total increase storage quota among a plurality of target users is determined according to at least one of a first strategy associated with quota proportions and a second strategy associated with used storage capacity. The allocation of the increase storage quota is determined automatically according to one or more pre-defined strategies, which can achieve storage quota allocation effectively and automatically, thereby increasing storage efficiency.

Embodiments of the present disclosure are described in detail below with reference to the drawings.

Figure 2:
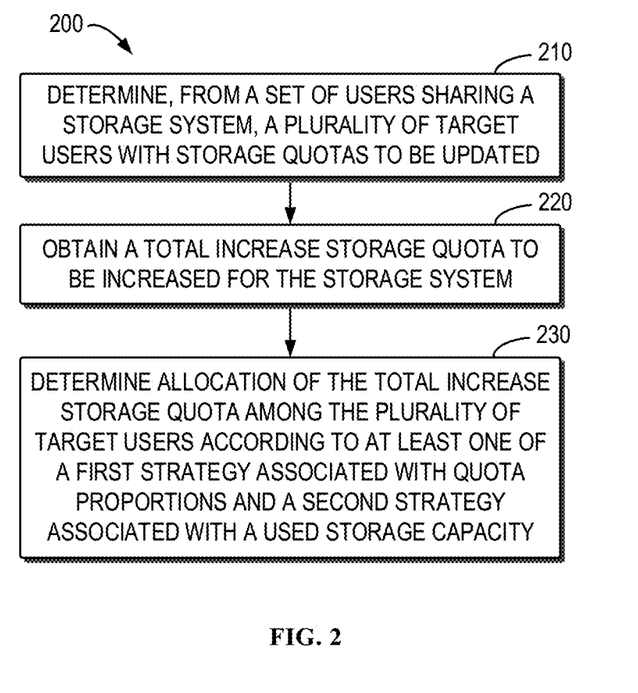
FIG. 2 illustrates a flowchart of a process for storage management in accordance with some embodiments of the present disclosure.

FIG. 2 illustrates a flowchart of a process 200 for storage management in accordance with some embodiments of the present disclosure. The process 200 may be performed by the management device 120 of FIG. 1. For ease of description, the process 200 is described with reference to FIG. 1.

At 210, the management device 120 determines, from a set of users 130 that shares the storage system 110, a plurality of target users with storage quotas to be updated.

The management device 120 may perform the process 200 if it is determined that the total storage quota of the storage system 110 will increase. The increase in the total storage quota of the storage system 110 may be triggered by various factors. In one example, if the storage capacity of the storage system 110 increases, for example, if more storage devices are added to the storage system 110, the total storage quota of the storage system 110 may increase, which means that an upper limit of the storage capacity to be used by the users increases. In another example, the increase of the total storage quota of the storage system 110 may also be manually triggered. For example, the administrator 122 may decide to increase the total storage quota of the storage system 110 based on requirements from various aspects. In these cases, the management device 120 may perform the process 220 to determine how the quotas of the users 130 are adjusted.

In the embodiments of the present disclosure, the management device 120 may determine the plurality of target users of which storage quotas are to be updated. In some embodiments, the target users may be specified by the administrator 122. That is, the management device 120 may receive a user input for selection of the plurality of target users and then determine, according to the selections of the target users, that the storage quotas of these target users are to be updated. In some further embodiments, a plurality of target users with storage quotas to be updated may also be automatically determined. As an alternative, the users with storage quotas to be updated are automatically recommended to the administrator 122 and the users may be determined as target users after receiving confirmation from the administrator 122. Thus, the administrator can still control the storage quota allocation as required. Such embodiments of automatic determination will be described in detail in the following.

At 220, the management device 120 obtains a total increase storage quota to be increased for the storage system 110. In some embodiments, the total increase storage quota may be configured by the administrator 122. In some further embodiments, the total increase storage quota may also be automatically determined, e.g., based on a total increase storage capacity of the storage system 110. The total increase storage quota may equal to the total increase storage capacity or a proportion (smaller than 100% or larger than 100%) of the total increase storage capacity.

If the plurality of target users and the total increase storage quota are determined, at 230, the management device 120 determines allocation of the total increase storage quota among a plurality of target users according to at least one of the first strategy associated with the quota proportion and the second strategy associated with the used storage capacity. In accordance with embodiments of the present disclosure, there are proposed two strategies selectable for determining how the total increase storage quota are allocated among the plurality of target users.

Specifically, the first quota proportion-based strategy allows allocating the total increase storage quota based on corresponding quota proportions of respective current storage quotas of the plurality of target users to a total current storage quota of the plurality of target users. The first strategy mainly focuses on proportions of storage quotas of the users, such that the proportions of the storage quotas of the plurality of target users can be kept as the same as possible after the allocation of the increase storage quota. Usually, the previous storage quotas of the users are set by the administrator based on experiences. The first strategy, if adopted, may reserve such prior experience or at least allow such prior experience affecting the subsequent allocation of the storage quotas.

The second used storage capacity-based strategy allows allocating the total increase storage quota by corresponding capacity proportions of respective used storage capacities of a plurality of target users to a total used storage capacity of the plurality of target users. The second strategy mainly focuses on the storage capacities actually used by the users so as to allocate more quotas to the users which have used more storage capacities. The second strategy may be used to correct possible deficiencies in the previous allocation of the storage quotas, so as to better satisfy the capacity requirements of the users, which can ensure that the users with a high requirement on storage capacity can be prioritized in allocating with more quotas.

In some embodiments, only the first strategy or only the second strategy is selected to allocate the total increase storage quota among the plurality of target users. In some other embodiments, the first strategy and the second strategy may be jointly used, collectively influencing the allocation of the total increase storage quota among the plurality of target users.

How the first strategy and the second strategy are used may be indicated by their respective contributions. A contribution of a strategy refers to an influence degree of the strategy on the storage quota allocation. A first contribution level of the first strategy and a second contribution level of the second strategy may be indicated by percentages. For example, the first contribution level of the first strategy may be represented as a percentage of Pe while the second contribution level of the second strategy may be represented as (1−Pe). If Pe=100%, it means that the first strategy is adopted while the second strategy is abandoned. If Pe=0%, it means that the second strategy is adopted while the first strategy is abandoned. If Pe is a value between 0% and 100%, it means that both the first strategy and the second strategy are used and the influence levels of the respective strategies on the storage quota allocation is determined by Pe and (1−Pe), respectively.

In some embodiments, Pe may be manually set by the administrator 122. In other words, the management device 120 may receive a user input for the first and second contribution levels. Therefore, the administrator 122 may control the storage quota allocation by inputting corresponding contributions of the respective strategies as required. Alternatively, the first and second contribution levels may also be set to default values, for example, set during the initial configuration of the storage system 110. Pe may, for example, be set to 50%, which means that the first strategy and the second strategy have the same influence on the storage quota allocation. Therefore, the quota proportions and the used storage capacities of the plurality of target users can equally impact the storage quotas to be increased for the users.

It will be described in detail below how the first strategy and the second strategy determine the allocation of the increase storage quota.

Figure 3:
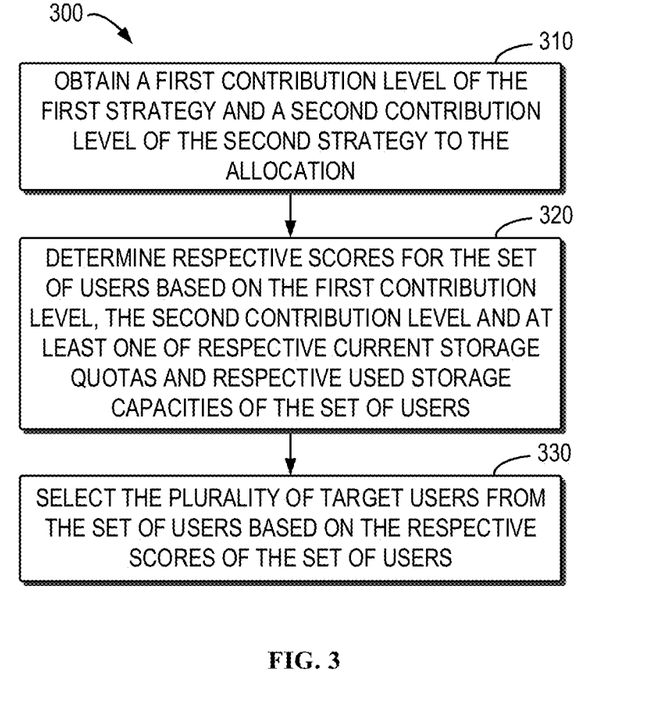
FIG. 3 illustrates a flowchart of a process of determining target users in accordance with some embodiments of the present disclosure.

In some embodiments, the use of the first strategy and the second strategy may also have an impact on the selection of the target users. Before describing the influence on the storage quotas by the first strategy and the second strategy, it will be described first how the target users are determined based on the use of the first strategy and the second strategy. FIG. 3 illustrates a flowchart of a process 300 of determining target users in accordance with some embodiments of the present disclosure. The process 300 may be performed by the management device 120 to determine, from a set of users 130 sharing the storage system 110, a plurality of target users with storage quotas to be updated.

Specifically, at 310, the management device 120 obtains the first contribution level of the first strategy and the second contribution level of the second strategy to the allocation. For example, the management device 120 may receive, from the administrator 122, the first contribution level Pe of the first strategy and correspondingly determine the second contribution level (1−Pe) of the second strategy. The management device 120 may also use the preset first contribution level and second contribution level.

At 320, the management device 120 determines corresponding scores of the set of users 130 based on the first contribution level, the second contribution level, and respective current storage quotas and respective used storage capacities of the set of users.

Specifically, in some embodiments, if the first contribution level indicates that the first strategy makes contributions to the allocation of the total increase storage quota (e.g., Pe larger than zero), which means that the first strategy is used, then the score of a user 130 may depend on a quota proportion of the current storage quota of this user to a total current storage quota of all the users 130. If it is assumed that an I-th user in the set of users has a current storage quota of $S_{Iq}$, and a total current storage quota of all the N users of the storage system 110 may be represented as $S_{Aq} = \Sigma_{I=1}^{N} S_{Iq}$, then a corresponding quota proportion of the current storage quota of the I-th user to the total current storage quota may be determined as $$\frac{S_{Iq}}{S_{Aq}}.$$

In the case where only me first strategy is considered, the score of the I-th user based on the quota proportion may be directly determined as $$S_{Ip} = \frac{S_{Iq}}{S_{Aq}}.$$

In other examples, the score of the I-th user based on the quota proportion may also be determined through other calculation methods based on the corresponding quota proportion of the user. For example, $S_{Ip}$ may be a multiple of the quota proportion $$\frac{S_{Iq}}{S_{Aq}}.$$

In some embodiments, if the second contribution level indicates that the second strategy makes contributions to the allocation of the total increase storage quota (e.g., (1−Pe) larger than zero), which means that the second strategy is used, then the score of each user 130 may depend on a capacity proportion of a used storage capacity of this user to a total used storage capacity of all the users 130. If it is assumed that an I-th user in the set of users has a used storage capacity of $S_{Iu}$, and the total used storage capacity of all the N users in the storage system 110 may be represented as $S_{Au} = \Sigma_{I=1}^{N} S_{Iu}$, then a corresponding capacity proportion of the used storage capacity of the I-th user to the total used storage capacity may be determined as $$\frac{S_{Iu}}{S_{Au}}.$$

In the case where only the second strategy is considered, the score of the I-th user based on the used storage capacity may be directly determined as $$S_{Is} = \frac{S_{Iu}}{S_{Au}}.$$

In other examples, the score of the I-th user based on the used storage capacity may also be determined through other calculation methods based on the corresponding capacity proportion of the user. For example, $S_{Is}$ may be a multiple of the capacity proportion $$\frac{S_{Iu}}{S_{Au}}.$$

If the first strategy and the second strategy both make contributions (e.g., Pe is valued between 0% and 100%), the score of each user 130 depends on the above quota proportion and capacity proportion (e.g., the respective scores based on the above two proportions, i.e., $S_{Ip}$ and $S_{Is}$) where the contributions of the two proportions are related to the contributions of the respective strategies. For example, a final score of a user 130 may be represented as $S_{IE} = P_e \times S_{Ip} + (1-P_e) \times S_{Is}$. The corresponding score for each user 130 may be determined. It would be appreciated that the final score of each user may also be determined through other calculation methods based on the corresponding scores of the respective strategies.

At 330, the management device 120 selects the plurality of target users from the set of users 130 based on the respective scores of the set of users 130. The management device 120 may sort the set of users 130 based on the determined respective scores and select the plurality of target users based on the sorting. In some embodiments, the number of target users to be selected (which may, for example, be represents as "n") may be preset or specified by the administrator 122. The management device 120 may select the first n users 130 after being sorted by the scores, as the target users. In some embodiments, the management device 120 may recommend the target users to the administrator 122 after sorting by the scores. For example, the management device 120 may select different numbers of users as a plurality of sets of candidate users, present the plurality of sets of candidate users to the administrator 122, and after receipt of confirmation from the administrator 122, select one set of candidate users confirmed by the user as the plurality of target users. In some embodiments, the management device 120 may also output the respective scores of the users 130 of the storage system 110 to the administrator 122. The respective scores of the users 130 may be used as reference for the administrator 122 to select the plurality of target users. The management device 120 may determine the plurality of target users after receiving the selection made by the administrator 122.

Figure 4:
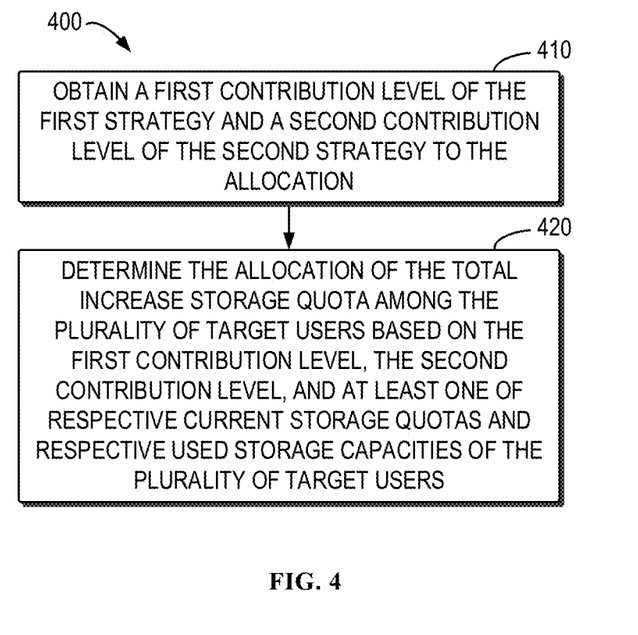
FIG. 4 illustrates a flowchart of a process of determining allocation of the total increase storage quota among a plurality of target users in accordance with some embodiments of the present disclosure.

As mentioned above, the use of the first strategy and the second strategy may influence the allocation of the total increase storage quota among the plurality of target users. FIG. 4 illustrates a flowchart of a process 400 of determining allocation of the total increase storage quota among the plurality of target users in accordance with embodiments of the present disclosure. The process 400 may be implemented by the management device 120.

Specifically, at 410, the management device 120 obtains the first contribution level of the first strategy and the second contribution level of the second strategy to the allocation. The manner of obtaining the first and second contribution levels is similar to that described in the process 300 of determining target devices, which thus will not be repeated here.

At 420, the management device 120 determines the allocation of the total increase storage quota among the plurality of target users, based on the first contribution level, the second contribution level, and at least one of respective current storage quotas and respective used storage capacities of the plurality of target users.

Specifically, if the first contribution level indicates that the first strategy contributes to the allocation of the total increase storage quota (e.g., Pe larger than zero), which means that the first strategy is used, the management device 120 determines a total current storage quota of the plurality of target users and further determines corresponding quota proportions of respective current storage quotas of the plurality of target users to the total current storage quota of the plurality of target users. If it is assumed that an i-th target user of the n target users has a current storage quota of $S_{iq}$, then a total current storage quota of the n target users may be represented as $S_{aq}=\Sigma_{i=1}^{n}S_{iq}$ and a corresponding quota proportion of the current storage quota of the i-th target user to the total current storage quota may be determined as $$\frac{S_{iq}}{S_{aq}}.$$

The management device 120 may determine, based on the corresponding quota proportion and the total increase storage quota, corresponding first expected increase storage quotas to be allocated to the plurality of target users according to the first strategy. The first expected increase quota of the i-th target user may be determined as $$S_{ip} = S_{increase} \times \frac{S_{iq}}{S_{aq}},$$

where $S_{increase}$ represents the total increase storage quota of the storage system 110. The respective first expected increase quotas of the plurality of target users are provided for determining actual increase quotas of the plurality of users. In the case where only the first strategy is considered (i.e., Pe=100%), an actual increase quota of the i-th target data may be determined as the corresponding first expected increase quota. If the second strategy is also considered in addition to the first strategy, a contribution of the first expected increase quota of the i-th target user to the actual increase quota is determined by the first contribution level of the first strategy, as described below.

In some embodiments, if the second contribution level indicates that the second strategy contributes to the allocation of the total increase storage quota (e.g., (1−Pe) larger than zero), which means that the second strategy is used, the management device 120 determines a total used storage capacity of the plurality of target users and further determines corresponding capacity proportions of respective used storage capacity of the plurality of target users to the total used storage capacity of the plurality of target users. If it is assumed that an i-th target user of the n target users has a used storage capability of $S_{iu}$, then a total used storage capability of the n target users may be represented as $S_{au}=\Sigma_{i=1}^{n}S_{iu}$ and a corresponding capability proportion of the used storage capability of the i-th target user to the total used storage capability may be determined as $$\frac{S_{iu}}{S_{au}}.$$

The management device 120 may determine, based on the corresponding capacity proportion and the total increase storage quota, corresponding second expected increase quotas to be allocated to the plurality of target users according to the second strategy. The second expected increase quota of the i-th target user may be determined as $$S_{is} = S_{increase} \times \frac{S_{iu}}{S_{au}},$$

where $S_{increase}$ represents the total increase storage quota of the storage system 110. The respective second expected increase quotas of the plurality of target users may be provided for determining the actual increase quotas of the plurality of target users. In the case where only the second strategy is considered (i.e., Pe=0%), the actual increase quota of the i-th target user may be determined as corresponding second expected increase quota.

If the first strategy and the second strategy both contribute to the storage quota allocation, the actual increase quotas of the plurality of target users are determined based on the respective first expected increase quotas and the respective second expected increase quotas of the plurality of target users, the first contribution level, and the second contribution level. A contribution of the first expected increase quotas in the actual increase quotas is determined by the first contribution level while a contribution of the second expected increase quotas in the actual increase quotas is determined by the second contribution level. For example, the actual increase quota of the i-th target user may be determined as $(P_e \times S_{ip} + (1-P_e) \times S_{is})$. Furthermore, an updated storage quota of the i-th target user may be a sum of the current storage quota and the actual increase quota of the target user. For example, the updated storage quota of the i-th target user may be determined as $S_{in}=S_{iq}+P_e \times S_{ip}+(1-P_e) \times S_{is}$.

The embodiments described above can implement automatic update of the storage quota in an effective and rapid way. The whole solution is less complicated in computation and has a small influence on the storage system performance. In addition, according to this solution, the administrator can still conveniently and effectively control the target users to be added with storage quotas and control the strategies used for the storage quota allocation according to requirements. The strategy associated with the quota proportion can explore the prior experience in storage quota setting and the strategy associated with the used storage capacity can fully consider the users' requirements on storage capacities. The two strategies may be flexibly used in the present disclosure.

To better understand some embodiments of the present disclosure, allocation of the increase storage quota in the storage system is described below with reference to a specific example. The storage system 110 in FIG. 1 is used as the example and it is assumed that all the users of the storage system 110 include the users 130-1 to 130-3. It is also assumed that the current total storage capacity of the storage system 110 is 100 GB, the current storage quotas of users 130-1 to 130-3 are 40 GB, 50 GB and 60 GB, respectively and the used storage capacities of the users 130-1 to 130-3 are 39 GB, 40 GB, and 6 GB separately. Current storage quotas and used storage capacities of the three users are summarized below in Table 1.

TABLE 1

Current storage quota and usage of the users

| Users | Current storage quotas | Used storage capacities |
|---|---|---|
| User 130-1 | 40 GB | 39 GB |
| User 130-2 | 50 GB | 40 GB |
| User 130-3 | 60 GB | 6 GB |

It is assumed that the storage capacity of the storage system 110 is increased, for example, by 200 GB. The storage quota of the storage system 110 may increase, for example, the total increase storage quota of the storage system 110 may be equal to a total increase storage capacity, i.e., $S_{increase}$=200 GB. The management device 120 may determine how a total of 200 GB increase storage quota is allocated among the users 130 based on the solution proposed by some embodiments of the present disclosure.

First, the management device 120 may select, from the users 130-1 to 130-3, the plurality of target users with storage quotas to be updated. The management device 120 may determine corresponding quota proportions of the current storage quotas of the respective users 130-1 to 130-3 to a total current storage quota of these users, and determine corresponding scores of the respective users based on the corresponding quota proportions as shown in Equations (1) to (3) below:

$$S_{1p} = \frac{40}{(40+50+60)} = \frac{4}{15} \quad \text{Equation (1)}$$

$$S_{2p} = \frac{50}{(40+50+60)} = \frac{5}{15} \quad \text{Equation (2)}$$

$$S_{3p} = \frac{60}{(40+50+60)} = \frac{6}{15} \quad \text{Equation (3)}$$

The management device 120 may also determine corresponding capacity proportions of the used storage capacities of the respective users 130-1 to 130-3 to a total used storage capacity of these users and determine corresponding scores for the respective users based on the corresponding capacity proportions as shown in Equations (4)-(6) below:

$$S_{1s} = \frac{39}{(39+40+6)} = \frac{39}{85} \quad \text{Equation (4)}$$

$$S_{2s} = \frac{40}{(39+40+6)} = \frac{40}{85} \quad \text{Equation (5)}$$

$$S_{3s} = \frac{6}{(39+40+6)} = \frac{6}{85} \quad \text{Equation (6)}$$

If the first contribution level Pe is set to 0%, meaning that only the second strategy is used, the users 130 are sorted by the scores based on the capacity proportions and a predetermined number of target users (e.g., two users) are selected from the users 130, i.e., the top users 130-2 and 130-1. If the first contribution level Pe is set to 100%, meaning that only the first strategy is used, the users 130 are sorted by the scores based on the quota proportions and a predetermined number of target users (e.g. two users) are selected from the users 130, i.e., the top users 130-2 and 130-1.

After the target users are selected, the management device 120 determines the allocation of the total increase storage quota among the plurality of target users based on the first contribution level of the first strategy, the second contribution level of the second strategy, and current storage quotas and used storage capacities of the respective target users.

If the first contribution level Pe is set to 0%, meaning that only the second strategy is used, an actual increase quota of each target user is determined based on the capacity proportion of the used storage capacity of this target user to the total used storage capacity of the plurality of target users. A sum of the actual increase quota and the current storage quota of the target user is an updated storage quota of this target user. For example, the updated storage quotas for the target users 130-1 and 130-2 may be determined respectively by the following Equations (7)-(8):

$$S_{user1n} = 40 \text{ } GB + 200 \text{ } GB \times \frac{39}{(39+40)} = 138.73 \text{ } GB \quad \text{Equation (7)}$$

$$S_{user2n} = 50 \text{ } GB + 200 \text{ } GB \times \frac{40}{(39+40)} = 151.27 \text{ } GB \quad \text{Equation (8)}$$

Figure 5A:
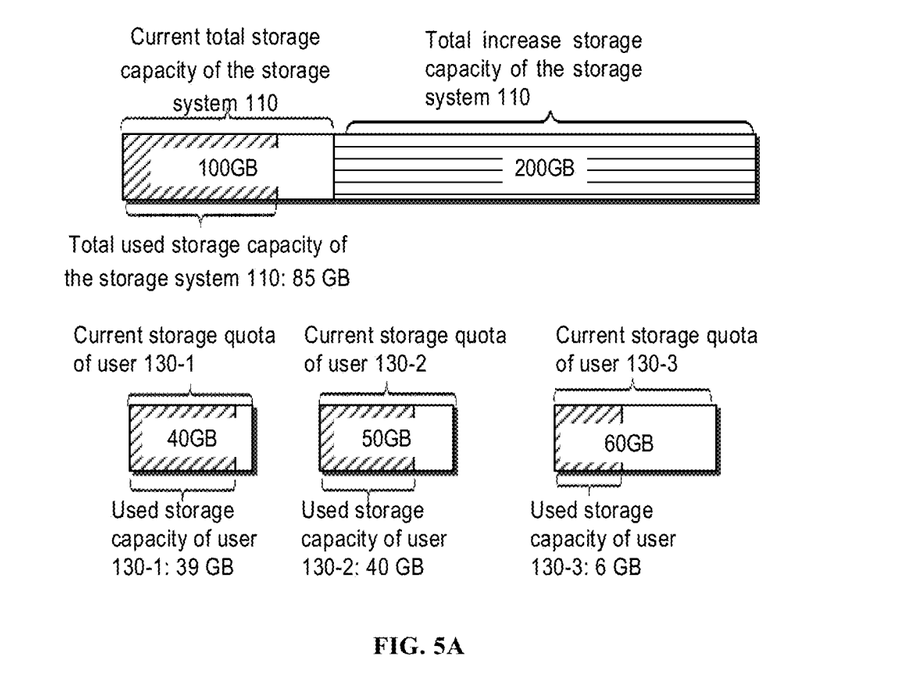
FIGS. 5A to 5C schematically illustrate examples of allocating storage quotas of the users of the storage system in accordance with some embodiments of the present disclosure.
Figure 5B:
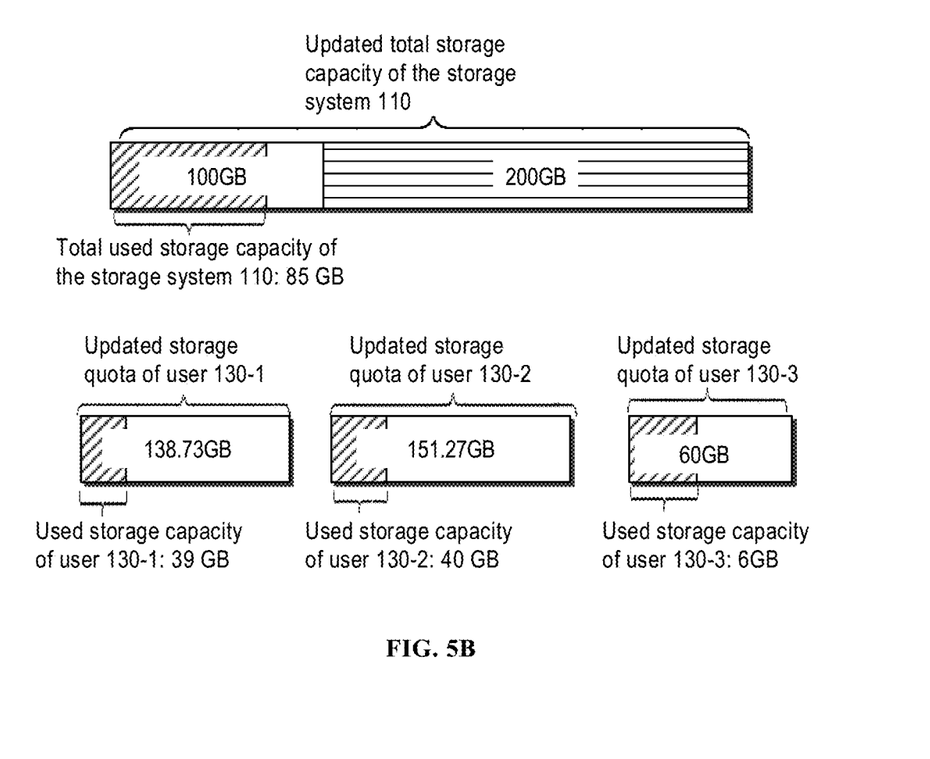

In this example, after the total increase storage quota is allocated to the target users, the storage quotas of the respective users 130 of the storage system 110 are illustrated in FIG. 5B.

If the first contribution level Pe is set to 100%, meaning that only the first strategy is used, an actual increase quota of each target user is determined based on the quota proportion of the current storage quota of this target user to the total current storage quota of the plurality of target users. A sum of the actual increase quota and the current storage quota of the target user is an updated storage quota of this target user. For example, the updated storage quotas for the target users 130-2 and 130-3 may be determined respectively by the following Equations (9)-(10):

$$S_{user2n} = 50 \text{ } GB + 200 \text{ } GB \times \frac{50}{(50+60)} = 140.91 \text{ } GB \quad \text{Equation (9)}$$

$$S_{user3n} = 60 \text{ } GB + 200 \text{ } GB \times \frac{60}{(50+60)} = 169.09 \text{ } GB \quad \text{Equation (10)}$$

Figure 5C:
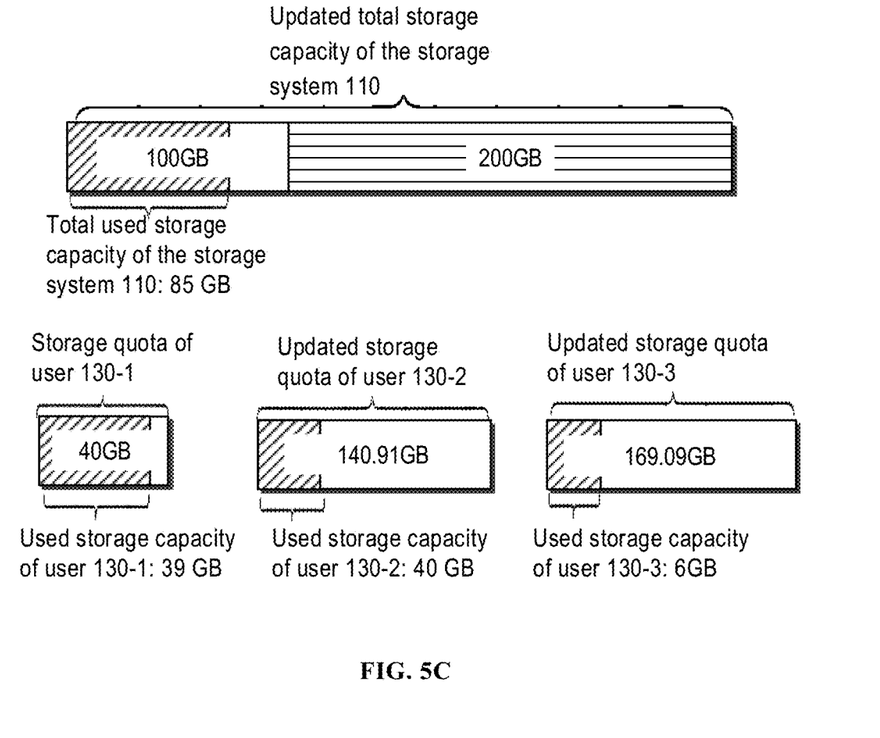

In this example, after the total increase storage quota IS allocated to the target users, the storage quotas of the respective users 130 of the storage system 110 are illustrated in FIG. 5C.

Storage quotas of the users 130 in the storage system 110 under different contribution levels are summarized in Table 2 below.

TABLE 2

Storage quotas of the users under different contribution levels

| Users | Current storage quotas | Storage quotas allocated using the first strategy only (Pe = 0%) | Storage quotas allocated using the second strategy only (Pe = 100%) |
|---|---|---|---|
| User 130-1 | 40 GB | 138.73 GB | 40 GB (unchanged) |
| User 130-2 | 50 GB | 151.27 GB | 140.91 GB |
| User 130-3 | 60 GB | 60 GB (unchanged) | 169.09 GB |

It would be appreciated that the above discussion only involves how the total increase storage quota are allocated in two examples where the first contribution level Pe is set to 0% and to 100%. In other examples, the first contribution level Pe may be set to other values and the target users and allocation of the total increase quotas among the target users may also be determined correspondingly based on the above discussed embodiments.

Figure 6:
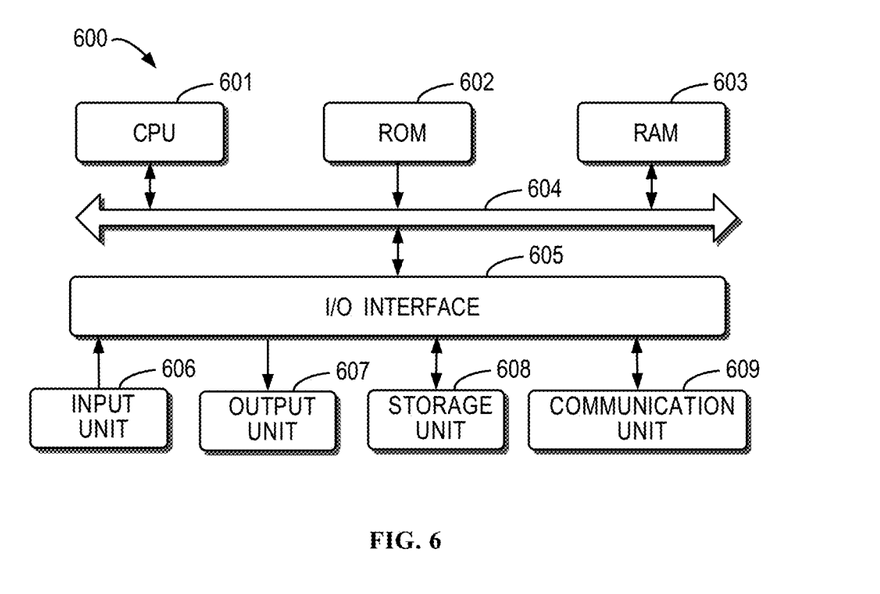
FIG. 6 illustrates a block diagram of an example device that can be used to implement embodiments of the present disclosure.

FIG. 6 illustrates a schematic block diagram of an example device 600 for implementing embodiments of the present disclosure. The device 600 can be implemented as the management device 120 of FIG. 1. The device 600 may be used for performing the process 200 of FIG. 2, the process 300 of FIG. 3 and/or process 300 of FIG. 4.

As shown in FIG. 6, the device 600 includes a central process unit (CPU) 601, which can execute various suitable actions and processing based on the computer program instructions stored in the read-only memory (ROM) 602 or computer program instructions loaded in the random-access memory (RAM) 603 from a storage unit 608. The RAM 603 can also store all kinds of programs and data required by the operation of the device 600. CPU 601, ROM 602 and RAM 603 are connected to each other via a bus 604. The input/output (I/O) interface 605 is also connected to the bus 604.

A plurality of components in the device 600 is connected to the I/O interface 605, including: an input unit 606, such as keyboard, mouse and the like; an output unit 607, e.g., various kinds of display and loudspeakers etc.; a storage unit 608, such as disk and optical disk etc.; and a communication unit 609, such as network card, modem, wireless transceiver and the like. The communication unit 609 allows the device 600 to exchange information/data with other devices via the computer network, such as Internet, and/or various telecommunication networks.

The processing unit 601 executes the above described various methods and processing, such as process 200, 300 and/or 400. For example, in some embodiments, the process 200, 300 and/or 400 can be implemented as a computer software program or a computer program product tangibly included in the machine-readable medium, e.g., non-transitory computer-readable medium like storage unit 608. In some embodiments, the computer program can be partially or fully loaded and/or mounted to the apparatus 600 via ROM 602 and/or communication unit 609. When the computer program is loaded to RAM 603 and executed by the CPU 601, one or more steps of the above described processes 200, 300 and/or 400 can be implemented. Alternatively, the CPU 601 can be configured to execute the processes 200, 300 and/or 400 through any other appropriate manners (such as by means of the firmware) in other embodiments.

Those skilled in the art should understand that each step of the above method of the present disclosure can be implemented by a general-purpose computing apparatus. They can be integrated on a single computing apparatus, or distributed on a network including a plurality of computing apparatuses. Optionally, they can be implemented using the executable program codes of the computing apparatus, such that they are stored in the storage apparatus for the execution by the computing apparatus, or they are respectively manufactured into various integrated circuit modules, or multiple modules or steps in them are manufactured into a single integrated circuit module for implementation. Thus, the present disclosure is not restricted to any particular combinations of hardware and software.

It would be appreciated that although the above detailed description mentions several apparatuses or sub-apparatuses of the device, the division is only by way of example rather than being compulsory. In fact, features and functions of the above described two or more apparatuses can be materialized in one apparatus according to the embodiments of the present disclosure. On the contrary, features and functions of the above described one apparatus can be further divided and materialized by several apparatuses.

The above description is only optional embodiments of the present disclosure, which does not restrict the present disclosure. For those skilled in the art, the present disclosure can have various modifications and alterations. Any amendments, equivalent substitutions, improvements and the like should be encompassed within the protection scope of the present disclosure as long as they are within the spirit and principle of the present disclosure.

We claim:

1. A method of storage management, comprising:
   determining, from a set of users sharing a storage system, a plurality of target users with storage quotas to be updated;
   obtaining a total increase storage quota to be increased for the storage system; and
   determining allocation of the total increase storage quota among the plurality of target users according to at least one of a first strategy associated with quota proportions and a second strategy associated with a used storage capacity;
   wherein determining the plurality of target users with storage quotas to be updated includes:
   selecting multiple target users from the set of users sharing the storage system in response to an indication that more storage space is being added to the storage system.

2. The method of claim 1, wherein the first strategy allows allocating the total increase storage quota based on corresponding quota proportions of respective current storage quotas of the plurality of target users to a total current storage quota of the plurality of target users, and the second policy allows allocating the total increase storage quota based on corresponding capacity proportions of respective used storage capacities of the plurality of target users to a total used storage capacity of the plurality of users.

3. The method of claim 1, wherein selecting the multiple target users comprises:
   receiving a user input for selection of the plurality of target users; and
   determining the multiple target users according to the selection of the plurality of target users.

4. The method of claim 1, wherein the indication that more storage space is being added to the storage system is triggered by a particular amount of storage space being added to the storage system; and
   wherein obtaining the total increase storage quota to be increased for the storage system includes:
   acquiring, as the total increase storage quota, a proportion of the particular amount of storage space that is different from 100% of the particular amount of storage space.

5. A method of storage management, comprising:
   determining, from a set of users sharing a storage system, a plurality of target users with storage quotas to be updated;
   obtaining a total increase storage quota to be increased for the storage system; and
   determining allocation of the total increase storage quota among the plurality of target users according to at least one of a first strategy associated with quota proportions and a second strategy associated with a used storage capacity;

wherein determining the plurality of target users comprises:
obtaining a first contribution level of the first strategy and a second contribution level of the second strategy to the allocation;

determining respective scores for the set of users based on the first contribution level, the second contribution level and at least one of respective current storage quotas and respective used storage capacities of the set of users; and selecting the plurality of target users from the set of users based on the respective scores of the set of users.

6. A method of storage management, comprising:
determining, from a set of users sharing a storage system, a plurality of target users with storage quotas to be updated;

obtaining a total increase storage quota to be increased for the storage system; and determining allocation of the total increase storage quota among the plurality of target users according to at least one of a first strategy associated with quota proportions and a second strategy associated with a used storage capacity;

wherein determining the allocation of the total increase storage quota among the plurality of target users comprises:
obtaining a first contribution level of the first strategy and a second contribution level of the second strategy to the allocation; and determining the allocation of the total increase storage quota among the plurality of target users based on the first contribution level, the second contribution level, and at least one of respective current storage quotas and respective used storage capacities of the plurality of target users.

7. The method of claim 6, wherein determining the allocation of the total increase storage quota among the plurality of target users comprises:
in accordance with a determination that the first contribution level indicates the first strategy contributing to the allocation, determining corresponding quota proportions of respective current storage quotas of the plurality of target users to a total current storage quota of the plurality of target users;

determining, based on the corresponding quota proportions and the total increase storage quota, corresponding first expected increase quotas to be allocated to the plurality of target users according to the first strategy; and determining, based on the corresponding first expected increase quotas, corresponding actual increase quotas to be allocated to the plurality of target users from the total increase storage quota.

8. The method of claim 6, wherein determining the allocation of the total increase storage quota among the plurality of target users comprises:
in accordance with a determination that the second contribution level indicates the second strategy contributing to the allocation, determining corresponding capacity proportions of respective used storage capacities of the plurality of target users to a total used storage capacity of the plurality of target users;

determining, based on the corresponding capacity proportions and the total increase storage quota, corresponding second expected increase quotas to be allocated to the plurality of target users according to the second strategy; and determining, based on the corresponding second expected increase quotas, corresponding actual increase quotas to be allocated to the plurality of target users from the total increase storage quota.

9. The method of claim 6, wherein obtaining the first contribution level and the second contribution level comprises:
receiving a user input for the first and second contribution levels.

10. An electronic device, comprising:
a processor; and
a memory coupled to the processor and having instructions stored thereon, the instructions, when executed by the processor, causing the device to perform acts comprising:
determining, from a set of users sharing a storage system, a plurality of target users with storage quotas to be updated;

obtaining a total increase storage quota to be increased for the storage system; and determining allocation of the total increase storage quota among the plurality of target users according to at least one of a first strategy associated with quota proportions and a second strategy associated with a used storage capacity;

wherein determining the plurality of target users with storage quotas to be updated includes:
selecting multiple target users from the set of users sharing the storage system in response to an indication that more storage space is being added to the storage system.

11. The device of claim 10, wherein the first strategy allows allocating the total increase storage quota based on corresponding quota proportions of respective current storage quotas of the plurality of target users to a total current storage quota of the plurality of target users, and the second policy allows allocating the total increase storage quota based on corresponding capacity proportions of respective used storage capacities of the plurality of target users to a total used storage capacity of the plurality of users.

12. The device of claim 10, wherein selecting the multiple target users comprises:
receiving a user input for selection of the plurality of target users; and
determining the multiple target users according to the received selection of the plurality of target users.

13. An electronic device, comprising:
a processor; and
a memory coupled to the processor and having instructions stored thereon, the instructions, when executed by the processor, causing the device to perform acts comprising:
determining, from a set of users sharing a storage system, a plurality of target users with storage quotas to be updated;

obtaining a total increase storage quota to be increased for the storage system; and determining allocation of the total increase storage quota among the plurality of target users according to at least one of a first strategy associated with quota proportions and a second strategy associated with a used storage capacity;

wherein determining the plurality of target users comprises:
obtaining a first contribution level of the first strategy and a second contribution level of the second strategy to the allocation;
determining respective scores for the set of users based on the first contribution level, the second contribution level and at least one of respective current storage quotas and respective used storage capacities of the set of users; and
selecting the plurality of target users from the set of users based on the respective scores of the set of users.

14. An electronic device, comprising:
a processor; and
a memory coupled to the processor and having instructions stored thereon, the instructions, when executed by the processor, causing the device to perform acts comprising:
determining, from a set of users sharing a storage system, a plurality of target users with storage quotas to be updated;
obtaining a total increase storage quota to be increased for the storage system; and
determining allocation of the total increase storage quota among the plurality of target users according to at least one of a first strategy associated with quota proportions and a second strategy associated with a used storage capacity;
wherein determining the allocation of the total increase storage quota among the plurality of target users comprises:
obtaining a first contribution level of the first strategy and a second contribution level of the second strategy to the allocation; and
determining the allocation of the total increase storage quota among the plurality of target users based on the first contribution level, the second contribution level, and at least one of respective current storage quotas and respective used storage capacities of the plurality of target users.

15. The device of claim 14, wherein determining the allocation of the total increase storage quota among the plurality of target users comprises:
in accordance with a determination that the first contribution level indicates the first strategy contributing to the allocation, determining corresponding quota proportions of respective current storage quotas of the plurality of target users to a total current storage quota of the plurality of target users;
determining, based on the corresponding quota proportions and the total increase storage quota, corresponding first expected increase quotas to be allocated to the plurality of target users according to the first strategy; and
determining, based on the corresponding first expected increase quotas, corresponding actual increase quotas to be allocated to the plurality of target users from the total increase storage quota.

16. The device of claim 14, wherein determining the allocation of the total increase storage quota among the plurality of target users comprises:
in accordance with a determination that the second contribution level indicates the second strategy contributing to the allocation, determining corresponding capacity proportions of respective used storage capacities of the plurality of target users to a total used storage capacity of the plurality of target users;
determining, based on the corresponding capacity proportions and the total increase storage quota, corresponding second expected increase quotas to be allocated to the plurality of target users according to the second strategy; and
determining, based on the corresponding second expected increase quotas, corresponding actual increase quotas to be allocated to the plurality of target users from the total increase storage quota.

17. The device of claim 14, wherein obtaining the first contribution level and the second contribution level comprises:
receiving a user input for the first and second contribution levels.

18. A computer program product having a non-transitory computer readable medium which stores a set of instructions to perform storage management; the set of instructions, when carried out by computerized circuitry, causing the computerized circuitry to perform a method of:
determining, from a set of users sharing a storage system, a plurality of target users with storage quotas to be updated;
obtaining a total increase storage quota to be increased for the storage system; and
determining allocation of the total increase storage quota among the plurality of target users according to at least one of a first strategy associated with quota proportions and a second strategy associated with a used storage capacity:
wherein determining the plurality of target users with storage quotas to be updated includes:
selecting multiple target users from the set of users sharing the storage system in response to an indication that more storage space is being added to the storage system.

19. The computer program product of claim 18, wherein the computer-executable instructions, when executed, cause the device to select the multiple target users by:
obtaining a first contribution level of the first strategy and a second contribution level of the second strategy to the allocation;
determining respective scores for the set of users based on the first contribution level, the second contribution level and at least one of respective current storage quotas and respective used storage capacities of the set of users; and
selecting the multiple target users from the set of users based on the respective scores of the set of users.

20. The computer program product of claim 19, wherein the computer-executable instructions, when executed, cause the device to obtain the first contribution level and the second contribution level by:
receiving a user input for the first and second contribution levels.

* * * * *